US009782712B2

United States Patent
Baxter

(10) Patent No.: US 9,782,712 B2
(45) Date of Patent: Oct. 10, 2017

(54) INTELLIGENT FABRIC FILTER MONITORING AND CONTROL OVER POWER LINES

(71) Applicant: Dust Company, Inc., Raleigh, NC (US)

(72) Inventor: Robert Wyatt Baxter, Raleigh, NC (US)

(73) Assignee: Dust Company, Inc., Raleigh, NC (US)

( * ) Notice: Subject to any disclaimer, the term of this patent is extended or adjusted under 35 U.S.C. 154(b) by 252 days.

(21) Appl. No.: 14/809,918

(22) Filed: Jul. 27, 2015

(65) Prior Publication Data

US 2017/0028337 A1    Feb. 2, 2017

(51) Int. Cl.
*B01D 46/46*    (2006.01)
*B01D 46/00*    (2006.01)

(52) U.S. Cl.
CPC ......... *B01D 46/46* (2013.01); *B01D 46/0086* (2013.01)

(58) Field of Classification Search
CPC .......................... B01D 46/46; B01D 46/0086
See application file for complete search history.

(56) References Cited

U.S. PATENT DOCUMENTS

2015/0202558 A1*  7/2015  Barker  .............. B01D 46/0064
                                                                95/20

* cited by examiner

*Primary Examiner* — Robert Deberadinis
(74) *Attorney, Agent, or Firm* — Myers Bigel, P.A.

(57) ABSTRACT

A system includes a device on a fabric filter having an attribute that is adjustable and a module on the fabric filter that is configured to adjust the attribute responsive to a control signal carried on a power line from which the module receives a power signal.

28 Claims, 4 Drawing Sheets

INTELLIGENT FABRIC FILTER MONITORING AND CONTROL OVER POWER LINES

FIELD OF THE INVENTION

The present invention relates to industrial pollution control systems and, more particularly, to fabric filter monitoring and control systems for fabric filters. A fabric filter unit may comprise one or more compartments containing rows of fabric bags in the form of round, flat, or shaped tubes, or pleated cartridges. Fabric filters are sometimes referred to in industry as baghouses.

BACKGROUND

A baghouse or fabric filter, whether it uses traditional bags with cages or pleated cartridge filters, is an air pollution control device that removes particulates out of air or gas released from commercial processes or combustion for electricity generation. Many different types of industrial companies use baghouses to control emission of air pollutants including power plants, steel mills, pharmaceutical producers, food manufacturers, and chemical producers. Depending on the process requirements and/or air flow to be cleaned, baghouses can range from a single compartment filter to a large multi-compartment filter. Baghouses are generally defined by their cleaning methods. The two major categories are off-line cleaning baghouses and on-line cleaning baghouses. Off-line cleaning refers to the type of baghouse where the compartment is isolated and does not filter dirty air during the cleaning process. The types of baghouses using off-line cleaning include shakers, sonic horns, pulse-jet, and reverse air.

For a shaker style baghouse, the compartment is isolated from dirty air at the start of the cleaning cycle and the bags in that compartment are mechanically shaken. The shaking breaks up the filtered cake and with no air flow through the compartment the cake drops into a hopper below the compartment. This style of baghouse may use up to four output and four additional inputs. The outputs would be to open and close the inlet and output isolation valves and the inputs would be switches to confirm the isolation valve position. Additional outputs may be required to initiate the shaking mechanism for each compartment.

The sonic horns style baghouse is similar to the shaker style with the exception that the cake is broken up by sound of the sonic horn instead of a mechanical shaking mechanism. This style of baghouse may use up to four output and four additional inputs. The outputs would be to open and close the inlet and output isolation valves and the inputs would be switches to confirm the isolation valve position. Additional outputs may be required to initiate the sonic horns for each compartment.

The pulse-jet style baghouse involves isolating the compartment and then the pulse-valves are fired to generate a blast of air down each bag in a row. The blast of air breaks the cake loose and allows it to drop to the hopper below. This style of baghouse typically has one solenoid valve for each row of bags. Larger baghouses may have split rows and may use two valves per row. The row valves are pulsed, which means they are on for only a fraction of a second to create the blast of air used for cleaning. In an off-line configuration, each compartment may use up to four additional outputs and four additional inputs. The outputs would be to open and close the inlet and output isolation valves and the input would be switches to confirm the isolation valve position.

The reverse air style baghouse involves isolation of the compartment from filtering dirty gases and a clean air source is sent in the reverse flow from the filter gas. Reversing the air flow breaks up the filtered cake and allows it to drop into the hopper. This style of baghouse may use up to four outputs and four additional inputs. The outputs would be to open and close the inlet and output isolation valves and the inputs would be switches to confirm the isolation valve position. Additional outputs may be used to open the clean air gates and initiate the clean air flow.

On-line cleaning refers to the type of baghouse where the compartment is cleaned while it continues to filter the dirty gas stream. The pulse-jet baghouse may be used in an on-line cleaning configuration. While the baghouse or compartment is filtering dirty gases, a blast of air is sent down each bag in a selected row. The blast of air breaks the cake loose. Because the compartment or baghouse is still filtering, the gas velocity may carry some of the lighter material to another bag while the heavier material falls into the hopper below. This style of baghouse typically has one solenoid valve for each row of bags. Larger baghouses may have split rows and use two valves per row. The row valves are pulse, which means they are on for only a fraction of a second to create the blast of air used for cleaning.

While there are several different types of baghouses as described above, the monitoring and control systems for controlling the baghouse cleaning cycle are similar across the different types. A series of solenoid valves and other mechanical apparatus may be used to pulse bags, isolate compartments, open/close valves, active/deactivate horns, and active/deactivate shaking mechanisms. As shown in the baghouse control system of FIG. 1, this typically involves long runs of wire from a controller 105 to each baghouse module. The modules may correspond to discrete input and output devices 110, such as valves, relays, switches, and the like as well as analog input and output devices 115, such as pressure control devices, temperature control devices, air flow control devices, valve positioning, and the like.

These long runs of wire can be expensive, however, and may make it more difficult to diagnose and troubleshoot problems. Safety may also be a concern when AC power is used due to support personnel handling the AC power in the field.

FIG. 2 illustrates a baghouse control system configuration where Input/Output (I/O) modules 220a, b, c are moved from the controller 205 to a location in the field closer to the discrete devices I/O 210 and the analog devices I/O 215. While this configuration reduces the amount of wiring required relative to that of FIG. 1, both power and communication wiring need to be run to each of the I/O modules 220a, b, c. The cabling running from the power source 225 to the I/O modules 220a, b, c are not run together with the communication wiring from the controller 205 and, therefore, additional conduit is required. Moreover, the relay modules for the controller 205 do not provide feedback on the status of the solenoid valves.

SUMMARY

Some embodiments provide a system comprises a device on a fabric filter having an attribute that is adjustable and a module on the fabric filter that is configured to adjust the attribute responsive to a control signal carried on a power line from which the module receives a power signal.

In other embodiments, the module is one of a plurality of modules on the fabric filter, the module having a receiver associated therewith that is configured to decode an address associated with the module.

In still other embodiments, the address is based on a frequency of the control signal.

In still other embodiments, the address is based on address data encoded in the control signal.

In still other embodiments, the control signal is frequency modulated.

In still other embodiments, the control signal is amplitude modulated.

In still other embodiments, the control signal is phase modulated.

In still other embodiments, the control signal is pulse width modulated.

In still other embodiments, the power signal is an Alternating Current (AC) power signal.

In still other embodiments, the power signal is a Direct Current (DC) power signal.

In still other embodiments, the module is configured to communicate a status of the device to a controller responsive to the control signal.

In still other embodiments, the module is configured to communicate diagnostic information for the device to a controller responsive to the control signal.

In still other embodiments, the device is a discrete device having a finite number of operable states.

In still other embodiments, the device is an analog device having an infinite number of operable states.

In further embodiments, a system comprises a controller that is configured to generate a control signal on a power line used to supply a module on a fabric filter with power, the control signal being configured to adjust an attribute of a device on the fabric filter through the module.

In still further embodiments, the module is one of a plurality of modules on the fabric filter, the module having a receiver associated therewith that is configured to decode an address associated with the module.

In still further embodiments, the address is based on a frequency of the control signal.

In still further embodiments, the address is based on address data encoded in the control signal.

In still further embodiments, the control signal is frequency modulated.

In still further embodiments, the control signal is amplitude modulated.

In still further embodiments, the control signal is phase modulated.

In still further embodiments, the control signal is pulse width modulated.

In still further embodiments, the power signal is an Alternating Current (AC) power signal.

In still further embodiments, the power signal is a Direct Current (DC) power signal.

In still further embodiments, the controller is configured to receive a status of the device from the module responsive to the control signal.

In still further embodiments, the controller is configured to receive diagnostic information for the device from the module responsive to the control signal.

In still further embodiments, the device is a discrete device having a finite number of operable states.

In still further embodiments, the device is an analog device having an infinite number of operable states.

In still further embodiments, the control signal is pulse width modulated.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS

Figure 1:
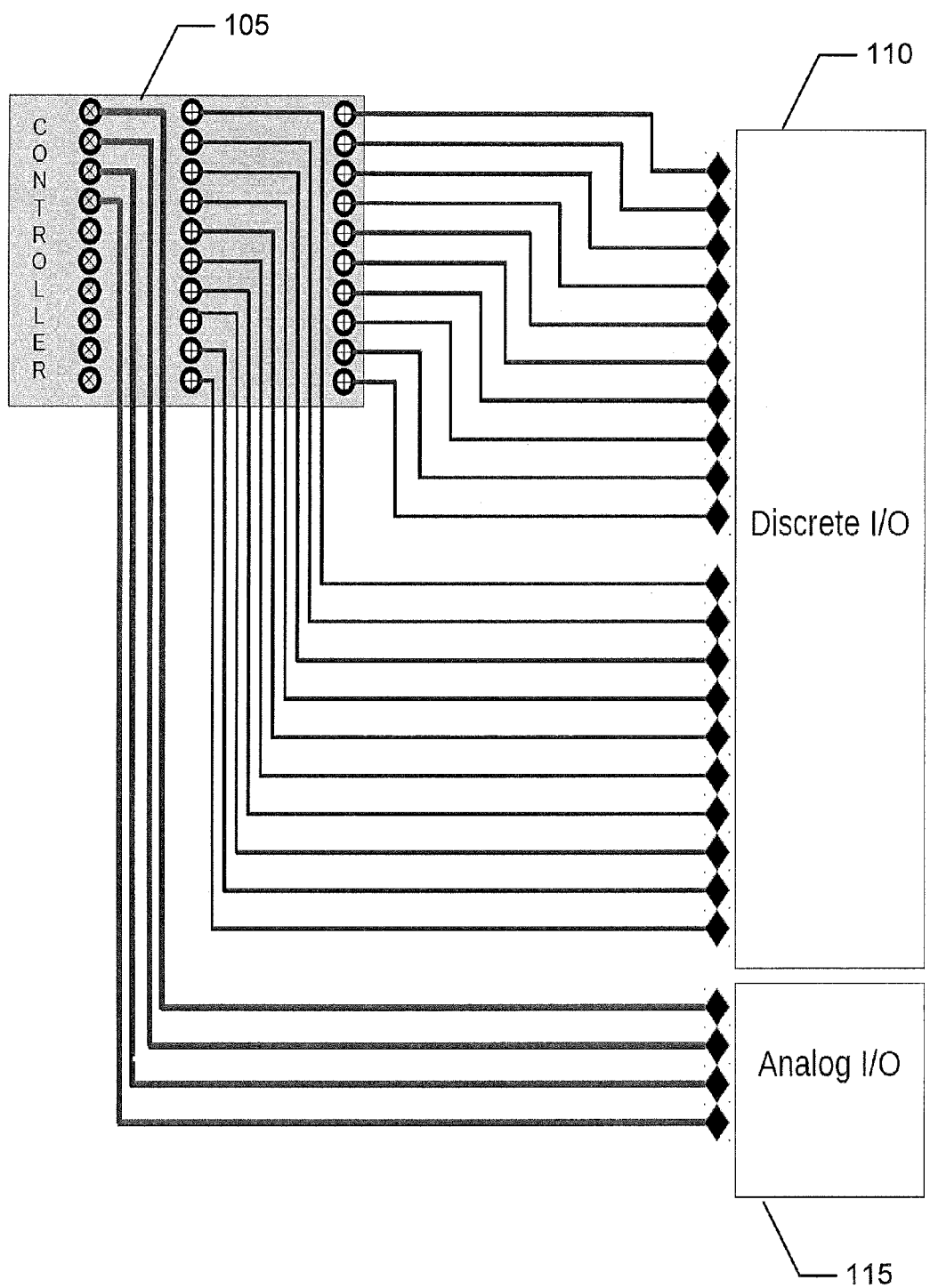
FIGS. 1 and 2 are diagrams that illustrate conventional baghouse control systems.
Figure 2:
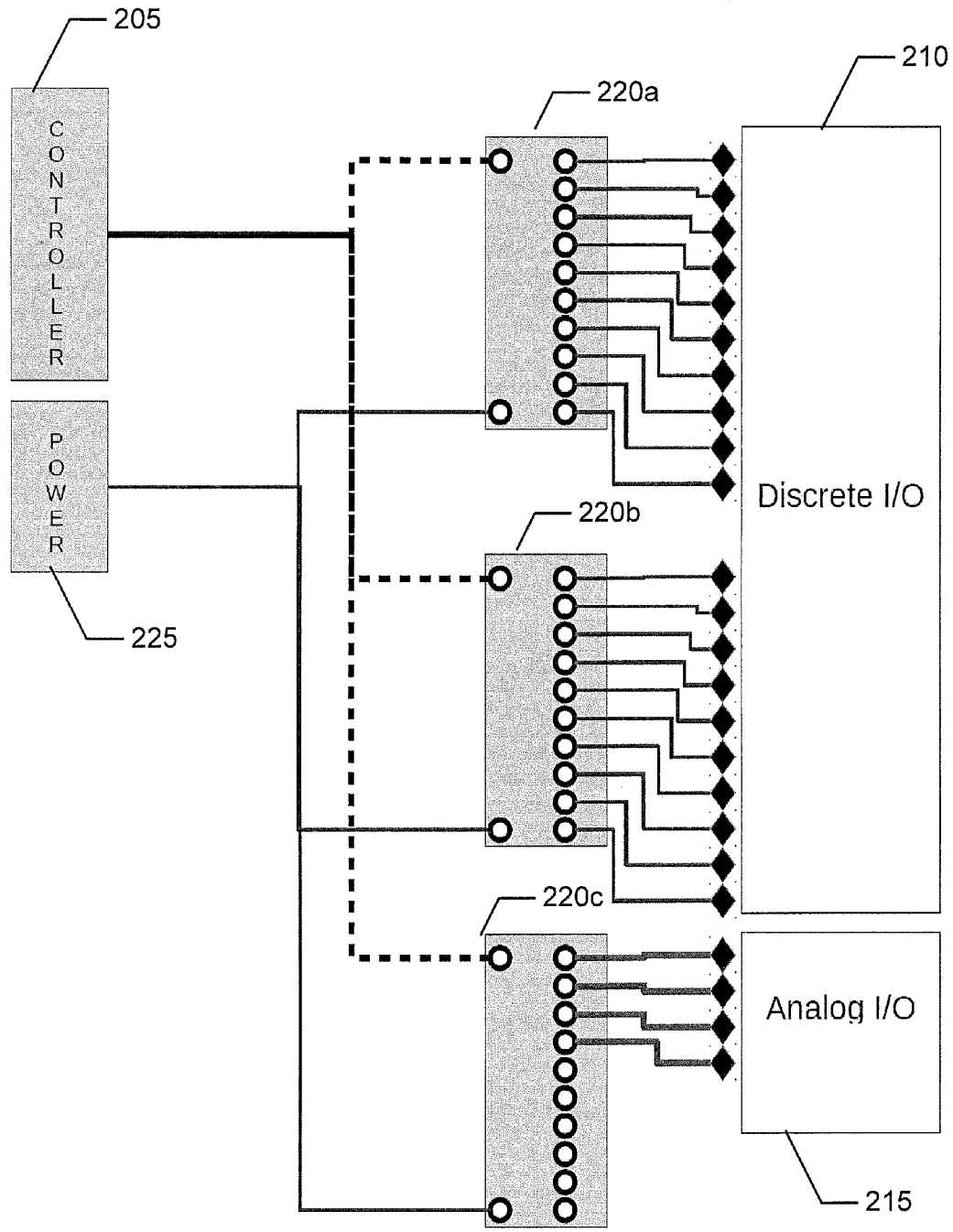

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the inventive subject matter are described herein with respect to monitoring and/or control of a fabric filter over a power line. As described above, a fabric filter unit may comprise one or more compartments containing rows of fabric bags in the form of round, flat, or shaped tubes, and/or pleated cartridges. Fabric filters may be referred to in industry as baghouses.

Some embodiments of the present inventive subject matter stem from a realization that power line communication (PLC) can be used to adjust or read the current state or value of one or more attributes of a device on a baghouse including discrete devices, such as a solenoid valve, relay, switch, or the like and analog devices, such as pressure indicator/control devices, temperature indicator/control devices, air flow indicator/control devices, and the like. A controller may include a control signal generation module that communicates with a module on the baghouse that is configured to monitor and/or adjust the attributes of one or more devices under its control or supervision responsive to the control signal. For discrete devices, the baghouse module may be configured to place the discrete device in one of its finite number of operable states, e.g., open, closed, on, off, etc. and/or monitor the current state of a discrete device, e.g., open closed, on, off, etc. For analog modules, the baghouse module may be configured to place the analog device into one of its infinite number of operable states, e.g., set a temperature to a particular value, set a gas flow rate to a particular value, set a pressure to a particular value, etc. and/or to monitor the current value of the desired analog value, etc. The baghouse module may also provide status and/or diagnostic information, e.g., switch position states, valve position states, temperature values, pressure values, and the like, for the device back to the controller responsive to the control signal and/or other parameters as needed for the control logic. By using power lines to carry the control signal to the module on the baghouse, expensive wiring runs from the controller to the I/O modules on the baghouse can be eliminated. Moreover, the status and diagnostic information provided through the module on the baghouse may allow personnel to diagnose problems quickly without the need to expose personnel to the baghouse equipment directly, which can be a safety issue.

Figure 3:
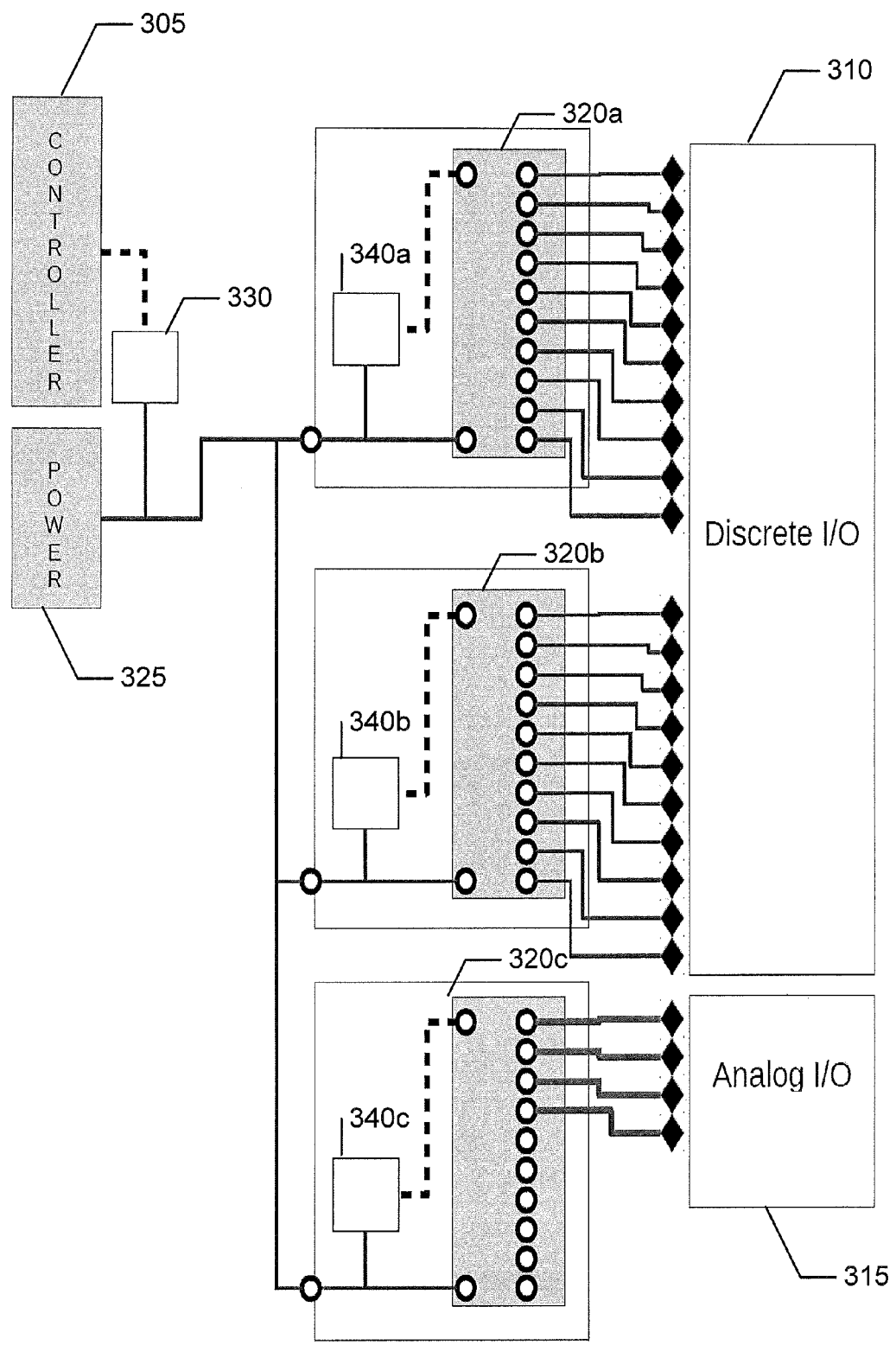
FIGS. 3 and 4 are diagrams that illustrate baghouse control systems incorporating baghouse device control over power lines according to some embodiments of the inventive subject matter.
Figure 4:
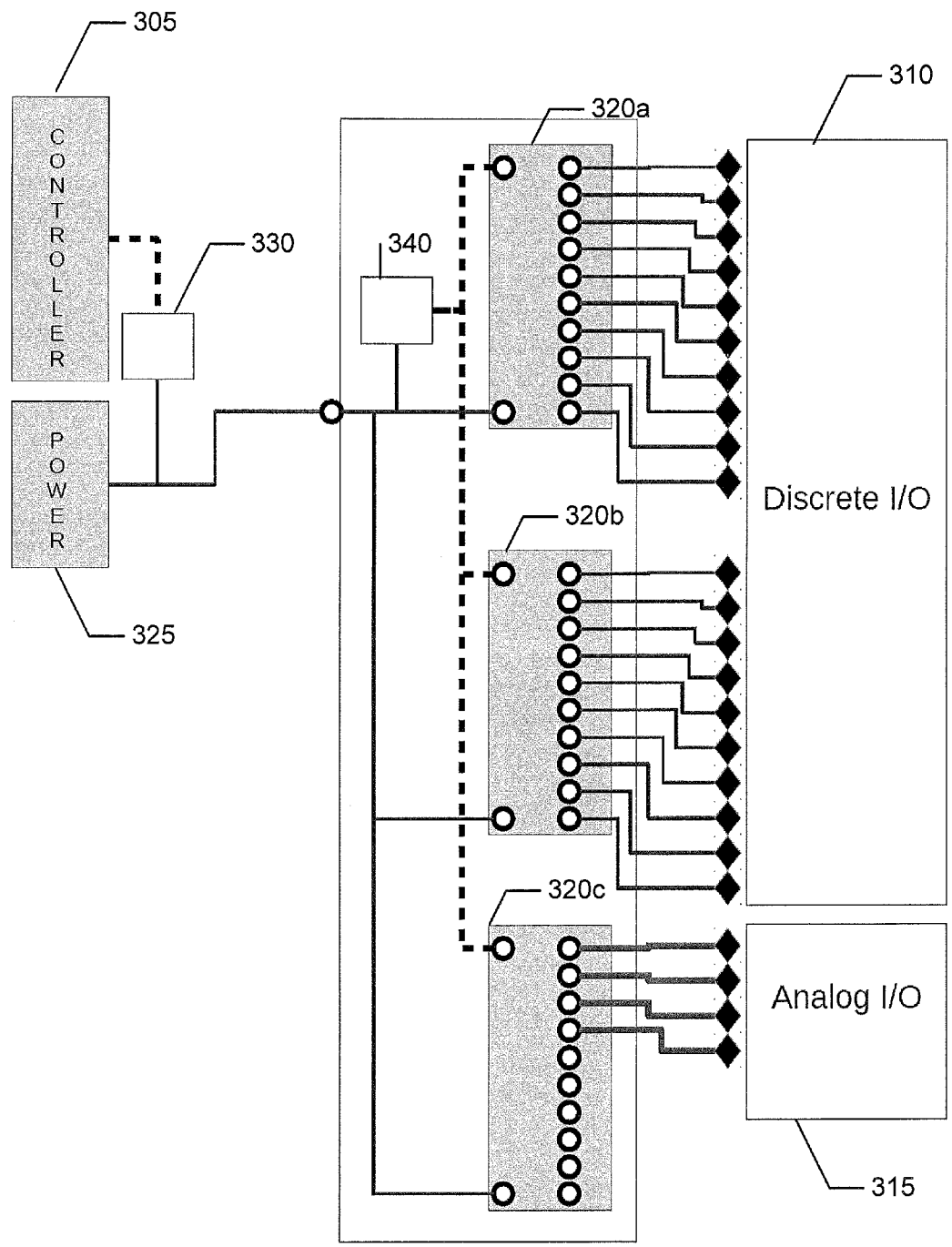

FIG. 3 is a diagram that illustrates a system for controlling a baghouse according to some embodiments of the inventive concept. As shown in FIG. 3, the controller, such as a programmable logic controller, 305 and the power source 325 use the same cabling to carry both power and control signals to the baghouse I/O modules 320a, 320b, and 320c. The power signal may be an Alternating Current (AC) or a Direct Current (DC) power signal in accordance with various embodiments of the inventive subject matter. The controller 305 further comprises a control signal generation module 330 that is used to generate a control signal for adjusting the attribute(s) of one or more devices on the baghouse. The baghouse includes modules 340a, 340b, 340c that are configured to receive the control signal from the control signal generation module 330 and to drive the respective I/O module 320a, 320b, 320c to adjust the attribute(s) of one or more baghouse devices identified through the control signal. As described above, for discrete devices, the baghouse module 340a, 340b, 340c may be configured to place a discrete device in one of its finite number of operable states. For analog modules, the baghouse module 340a, 340b, 340c may be configured to place the analog device into one of its infinite number of operable states. The baghouse modules 340a, 340b, and 340c may also be configured to collect status and/or diagnostic information for one or more of the devices under its supervision and provide this information back to the controller 305 over the power line. The status/diagnostic information may include, but is not limited to, switch position states, valve position states, temperature values, and pressure values. Thus, the baghouse modules 340a, 340b, and 340c may be used to provide both active control for adjusting one or more attributes of a baghouse device as well as provide monitoring of a current status of one or more parameters, states, or the like associated with the baghouse and/or the baghouse devices. FIG. 3 shows an embodiment in which a separate baghouse module 340a, b, c is used for each I/O module 320a, b, c. As shown in FIG. 4, a single baghouse module 340 may be used to control or supervise baghouse devices driven through all three I/O modules 320a, b, c.

The control signal generation module 330 impresses one or more control signals on the wiring used to carry electrical power from the power source 325 to the baghouse modules 340a, b, c and device I/O modules 320a, b, c. The one or more control signals may comprise one or more modulated carrier signals. Various types of modulation techniques can be used in accordance with different embodiments of the inventive subject matter. Power distribution wiring is generally designed for transmission of AC power at frequencies of around 50 Hz-60 Hz. While power line wiring and circuitry may be able to carry higher frequencies, such capability may be limited based on the type of wiring and circuitry used along with the distance the signal propagates before reaching the baghouse. The control signals may be frequency modulated, amplitude modulated, phase modulated, and/or pulse width modulated in accordance with various embodiments.

In some embodiments of the inventive subject matter, a control signal generated by the control signal generation module 330 is used to control one or more attributes of a baghouse device, such as the discrete and/or analog devices described above. The same control signal may be used to adjust the attribute of multiple baghouse devices through one or more of the baghouse modules 340a, b, c. In other embodiments, the control signal generation module 330 may be configured to use multiple control signals to adjust or control multiple attributes, respectively, on the baghouse devices on an individual basis. In some cases, baghouse devices may respond differently to the same control signal from the control signal generation module 330. For example, a control signal generated by the control signal generation module 330 to open a open a valve (first device) may also be used to adjust the air flow rate (second device).

In some embodiments, the baghouse modules 340a, b, c may have receiver circuits associated therewith that can decode an address encoded in the control signal from the control signal generation module. For example, the receiver circuits may each comprise a bandpass filter that is configured to pass signals within a specific frequency range to identify one or more baghouse devices associated therewith. Thus, a particular address of a baghouse device may be represented by a particular frequency or frequency band. In other embodiments, the receiver circuits may each comprise a decoder that is designed to decode a control signal received from the control signal generation module and obtain address information therefrom. If the address corresponds to the associated baghouse device, then the attribute of the baghouse device is adjusted appropriately based on the control signal. In this way, the control signal generation module 330 may adjust the attributes of the different baghouse devices on an individual basis. The control signal generation module 330 and the baghouse modules 340a, b, c may be configured with a user interface to allow an administrator to define logical and/or physical addresses for the particular baghouse devices installed on a baghouse and under the control of the controller 305.

Particulate matter pollution is becoming a greater environmental concern and resources are being spent to improve particulate controls. Baghouses are frequently used in controlling the spread of particulate matter. Embodiments of the present inventive subject matter may allow for reduced wiring costs for baghouse systems along with improved control over baghouse cleaning operations through use of intelligent modules installed on the baghouse. Diagnostic efficiency and employee safety may also be improved as diagnostic and status information can be obtained electronically.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system."

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A system comprising:
   a device on a fabric filter having an attribute that is adjustable; and
   a module on the fabric filter that is configured to adjust the attribute responsive to a control signal carried on a power line from which the module receives a power signal.

2. The system of claim 1, wherein the module is one of a plurality of modules on the fabric filter, the module having a receiver associated therewith that is configured to decode an address associated with the module.

3. The system of claim 2, wherein the address is based on a frequency of the control signal.

4. The system of claim 2, wherein the address is based on address data encoded in the control signal.

5. The system of claim 1, wherein the control signal is frequency modulated.

6. The system of claim 1, wherein the control signal is amplitude modulated.

7. The system of claim 1, wherein the control signal is phase modulated.

8. The system of claim 1, wherein the control signal is pulse width modulated.

9. The system of claim 1, wherein the power signal is an Alternating Current (AC) power signal.

10. The system of claim 1, wherein the power signal is a Direct Current (DC) power signal.

11. The system of claim 1, wherein the module is configured to communicate a status of the device to a controller responsive to the control signal.

12. The system of claim 1, wherein the module is configured to communicate diagnostic information for the device to a controller responsive to the control signal.

13. The system of claim 1, wherein the device is a discrete device having a finite number of operable states.

14. The system of claim 1, wherein the device is an analog device having an infinite number of operable states.

15. A system comprising:
    a controller that is configured to generate a control signal on a power line used to supply a module on a fabric filter with power, the control signal being configured to adjust an attribute of a device on the fabric filter through the module.

16. The system of claim 15, wherein the module is one of a plurality of modules on the fabric filter, the module having a receiver associated therewith that is configured to decode an address associated with the module.

17. The system of claim 16, wherein the address is based on a frequency of the control signal.

18. The system of claim 16, wherein the address is based on address data encoded in the control signal.

19. The system of claim 15, wherein the control signal is frequency modulated.

20. The system of claim 15, wherein the control signal is amplitude modulated.

21. The system of claim 15, wherein the control signal is phase modulated.

22. The system of claim 15, wherein the control signal is pulse width modulated.

23. The system of claim 15, wherein the power signal is an Alternating Current (AC) power signal.

24. The system of claim 15, wherein the power signal is a Direct Current (DC) power signal.

25. The system of claim 15, wherein the controller is configured to receive a status of the device from the module responsive to the control signal.

26. The system of claim 15, wherein the controller is configured to receive diagnostic information for the device from the module responsive to the control signal.

27. The system of claim 15, wherein the device is a discrete device having a finite number of operable states.

28. The system of claim 15, wherein the device is an analog device having an infinite number of operable states.

* * * * *